US012614733B2

(12) United States Patent
Wu et al.

(10) Patent No.: US 12,614,733 B2
(45) Date of Patent: Apr. 28, 2026

(54) POSITIVE ELECTRODE SLURRY, POSITIVE ELECTRODE PLATE AND BATTERY COMPRISING THE POSITIVE ELECTRODE PLATE

(71) Applicant: CONTEMPORARY AMPEREX TECHNOLOGY (HONG KONG) LIMITED, Hong Kong (CN)

(72) Inventors: Qifan Wu, Fujian (CN); Ming Zhang, Fujian (CN); Ziyi Yin, Fujian (CN); Yacheng Liu, Fujian (CN); Tongxian Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 638 days.

(21) Appl. No.: 18/121,707

(22) Filed: Mar. 15, 2023

(65) Prior Publication Data

US 2023/0420679 A1 Dec. 28, 2023

Related U.S. Application Data

(63) Continuation of application No. PCT/CN2021/132451, filed on Nov. 23, 2021.

(51) Int. Cl.
*H01M 4/62* (2006.01)
*H01M 4/02* (2006.01)
*H01M 4/04* (2006.01)

(52) U.S. Cl.
CPC ......... *H01M 4/622* (2013.01); *H01M 4/0404* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2005/0019656 A1 1/2005 Yoon et al.
2012/0153219 A1 6/2012 Zhang et al.
2019/0190006 A1 6/2019 Wang et al.

FOREIGN PATENT DOCUMENTS

CN 103943818 A 7/2014
CN 107507956 A 12/2017
(Continued)

OTHER PUBLICATIONS

WO-2017104554-A1 English machine translation (Year: 2017).*
(Continued)

*Primary Examiner* — Ula C Ruddock
*Assistant Examiner* — Maria F Orozco
(74) *Attorney, Agent, or Firm* — XSENSUS LLP

(57) ABSTRACT

The present disclosure provides a positive electrode slurry comprising a polyether siloxane, wherein the polyether siloxane may comprise at least the following structural units:

(I)

(II)

(III)

(Continued)

-continued (IV)

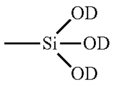

wherein D is methyl or ethyl; A is hydrogen, halogen or haloalkyl; B is hydroxyl, R, OR, or ROR', wherein the R and R' are each independently a linear or branched alkyl group containing 1 to 8 carbons; and E is phenyl, alkyl-substituted phenyl, ether-substituted phenyl, or halophenyl.

14 Claims, 1 Drawing Sheet

(56) References Cited

FOREIGN PATENT DOCUMENTS

| | | | | |
|---|---|---|---|---|
| CN | 107845812 A | | 3/2018 | |
| CN | 109935784 A | | 6/2019 | |
| CN | 110746922 A | | 2/2020 | |
| CN | 110797496 A | | 2/2020 | |
| CN | 111129406 A | | 5/2020 | |
| CN | 111129436 A | | 5/2020 | |
| CN | 112094413 A | * | 12/2020 | ............. C08G 77/26 |
| CN | 113644275 A | | 11/2021 | |
| JP | 2012528466 A | | 11/2012 | |
| JP | 2014078341 A | | 5/2014 | |
| WO | WO-2017104554 A1 | * | 6/2017 | .......... H01M 50/409 |

OTHER PUBLICATIONS

CN-112094413-A English machine translation (Year: 2020).*

Beyou et al., Convenient synthesis of a surface-active alkoxyamine-initiator from styrene oxide Living/free-radical polymerization of styrene and n-butyl acrylate, 2003, e-Polymers, vol. 3 (Year: 2003).*

Extended European Search Report issued Oct. 1, 2024 in European Patent Application No. 21953624.0.

International Search Report and Written Opinion mailed on Aug. 23, 2022, received for PCT Application PCT/CN2021/132451, filed on Nov. 23, 2021, 19 pages including English Translation.

Office Action issued May 20, 2024 in Japanese Patent Application No. 2023-516224 with English translation.

* cited by examiner

POSITIVE ELECTRODE SLURRY, POSITIVE ELECTRODE PLATE AND BATTERY COMPRISING THE POSITIVE ELECTRODE PLATE

CROSS-REFERENCE TO RELATED APPLICATION

The present application is a continuation of International Application No. PCT/CN2021/132451, filed Nov. 23, 2021, which is incorporated herein by reference in its entirety.

TECHNICAL FIELD

The present application relates to the technical field of lithium batteries, and in particular to a positive electrode plate comprising a polyether siloxane. In addition, the present application also relates to a secondary battery comprising the positive electrode plate, and a battery pack, a battery module and a power consuming device comprising the secondary battery.

BACKGROUND ART

In recent years, with the increasing application range of lithium-ion batteries, lithium-ion batteries are widely used in energy storage power systems such as hydroelectric, thermal, wind and solar power stations, as well as electric tools, electric bicycles, electric motorcycles, electric vehicles, military equipment, aerospace and other fields. Due to the great development of lithium-ion batteries, higher requirements have been placed on the lithium-ion batteries in terms of improved energy density and reduced costs.

At present, one of the effective ways to improve the energy density of lithium-ion batteries is to increase the coating weight of a positive electrode plate. However, using conventional methods to increase the coating weight of the positive electrode plate will reduce the yield in the manufacture of the plate and cause potential safety hazards, and even make it difficult to make lithium-ion batteries.

Therefore, the positive electrode plate still needs to be improved.

SUMMARY OF THE DISCLOSURE

The present application has been made in view of the above problems, and an objective thereof is to provide a positive electrode slurry comprising a specific polyether siloxane and a positive electrode plate prepared from the positive electrode slurry.

Therefore, a first aspect of the present disclosure provides a positive electrode slurry comprising a positive electrode active material and a polyether siloxane, wherein the polyether siloxane comprises at least the following structural units:

(I)

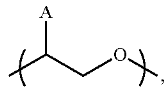

, (II)

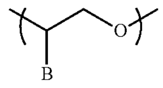

-continued (III)

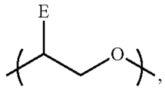

, (IV)

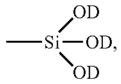

wherein,

D is methyl or ethyl;

A is hydrogen, halogen or haloalkyl, wherein the halogen is optionally fluorine, chlorine or bromine; and optionally, A is hydrogen or fluoromethyl;

B is hydroxyl, R, OR, or ROR', wherein the R and R' are each independently a linear or branched alkyl group containing 1 to 8 carbons; and optionally, B is methyl, ethyl or ethoxymethyl; and E is phenyl, alkyl-substituted phenyl, ether-substituted phenyl or halophenyl, and optionally, E is phenyl or fluorophenyl.

By adding into the positive electrode slurry a flexible additive, namely, the polyether siloxane described in the present application, the stability of the positive electrode slurry and the flexibility of the positive electrode plate can be improved, and the dispersibility of each material in the positive electrode plate can be ensured, thereby increasing the coating weight of the positive electrode plate.

In any embodiment of the present application, after the polyether siloxane is added into the positive electrode slurry, the energy density of the resulting lithium-ion battery is improved.

In any embodiment, the polyether siloxane has a number average molecular weight ranging from 10,000 to 60,000, and optionally 20,000 to 60,000.

The molecular weight has an influence on the processing performance of the positive electrode plate. Therefore, the number average molecular weight of the polyether siloxane must be controlled within the above range.

In any embodiment, in the polyether siloxane described in the present application, based on the total molar amount of structural unit (I) to structural unit (IV), the molar proportion of structural unit (I) is 0 to 75 mol %, the molar proportion of structural unit (II) is 0 to 70 mol %, the molar proportion of structural unit (III) is 5 to 65 mol %, and the molar proportion of structural unit (IV) is 4 to 10 mol %, wherein the molar proportions of structural unit (I) and structural unit (II) are not both zero.

The above molar proportions of the structural units (I) to (IV) can ensure that sufficient hydrogen bonds and a suitable amount of covalent bonds are formed between the obtained polyether siloxane and a positive electrode active material, current collector or the like, so as to ensure the stability of the positive electrode plate during the preparation process and the flexibility of the positive electrode plate as well as the dispersibility of each positive electrode material, thereby improving the energy density of the battery.

In any embodiment, the weight ratio of the polyether siloxane to the positive electrode active material ranges from 0.0005 to 0.030, optionally 0.001 to 0.02, more optionally 0.001 to 0.01, and most optionally 0.001 to 0.006.

When the ratio is too small, the positive electrode plate will crack at high coating weight; and when the ratio is too large, the battery performance will be adversely affected.

In any embodiment, the positive electrode active material is selected from at least one of lithium iron phosphate, lithium iron manganese phosphate, lithium manganese oxide, lithium cobalt oxide, lithium nickel cobalt manganese oxide, lithium nickel cobalt aluminum oxide, lithium nickel oxide or a mixture thereof.

The inventors of the present application have found that when the positive electrode active material is at least one of lithium iron phosphate, lithium iron manganese phosphate, lithium manganese oxide, lithium cobalt oxide, lithium nickel cobalt manganese oxide, lithium nickel cobalt aluminum oxide, lithium nickel oxide or a mixture thereof, the addition of the polyether siloxane can better achieve the effects of improving the flexibility of the plate, increasing the coating weight of the plate and the like.

In any embodiment, the positive electrode slurry has a stability factor of $0<V\leq 6$, and optionally $0<V\leq 4$, where $V=(V2-V1)/V1\times 100\%$, in which V1 is the initial viscosity of the positive electrode slurry, namely, the viscosity hour after preparation, and V2 is the viscosity of the positive electrode slurry 48 hours after preparation, wherein the positive electrode slurry used in the measurement of V1 and the positive electrode slurry used in the measurement of V2 are the same batch of positive electrode slurry.

The closer the viscosity of the positive electrode slurry 48 hours after preparation to the initial viscosity, the more stable the slurry viscosity is. When the stability factor $V\leq 6$, it is determined that the viscosity of the slurry is stable; and when $V>6$, it is determined that the viscosity of the slurry is not stable. It is measured that, after the polyether siloxanes within the scope of the present application are added, the stability factors of the positive electrode slurries are all $0<V\leq 6$, and optionally $0<V\leq 4$, while when certain other polyether siloxanes in the prior art are used, the stability factors are generally greater than 6.

A second aspect of the present application provides a positive electrode plate comprising a positive electrode current collector; and a positive electrode film layer on at least one surface of the positive electrode current collector, the positive electrode film layer comprising the positive electrode slurry described in the first aspect of the present application. As described above, by adding the polyether siloxane, the present application allows for an increase in coating weight on the positive electrode plate. This is also reflected in an increase in the maximum weight of the positive electrode film layer per unit plate. In some embodiments, the mass of the positive electrode film layer per unit area plate ranges from 13 to 45 $mg/cm^2$, optionally 20 to 43 $nm/cm^2$, more optionally 22 to 33 $mg/cm^2$, and most optionally 25 to 31 $mg/cm^2$, where the mass is the mass of the positive electrode film layer on a single surface of the plate. If there is a positive electrode film layer on both surfaces of the positive electrode plate, the mass range of the positive electrode film layers per unit area plate is twice the above range, that is, the mass range is 26 to 90 $mg/cm^2$, optionally 40 to 86 $mg/cm^2$, more optionally 44 to 66 $mg/cm^2$, and most optionally 50 to 62 $mg/cm^2$, where the mass is the mass of the positive electrode film layer on both surfaces of the plate.

When the weight of the positive electrode film layer per unit area plate is too small, the uniformity of the plate is poor; and when the weight of the positive electrode film layer per unit area plate is too large, cracking will occur in the coating process of the plate, making it impossible to continue production.

The positive electrode plate described in the present application has very good flexibility, and the coating weight is significantly improved. Therefore, the application of the positive electrode plate in a secondary battery, for example, directly adding into the positive electrode slurry during preparation, can improve the energy density of the battery.

In any embodiment, the weight ratio of lithium element to silicon element in the positive electrode plate corresponds to the weight ratio of lithium element to silicon element in the positive electrode slurry, that is, the weight ratio ranges from 60 to 3875, optionally 60 to 1950, more optionally 90 to 1950, and most optionally 380 to 1950.

In any embodiment, in the case that in the positive electrode slurry (or positive electrode plate), only the polyether siloxane contains silicon and only the active material contains lithium, the weight ratio of lithium element to silicon element corresponds to the weight ratio of the positive electrode active material to the polyether siloxane. Therefore, in view of this, the present application further limits the weight ratio of lithium element to silicon element. When the weight ratio of lithium element to silicon element is too large, the positive electrode plate will crack at high coating weight, and when the weight ratio is too small, the battery performance will be adversely affected.

In any embodiment, the positive electrode film layer comprises two sublayers which are parallel to the positive electrode current collector and overlap each other, wherein the ratio of the weight content of silicon in the sublayer closest to the positive electrode current collector to the weight content of silicon in the sublayer farthest from the positive electrode current collector ranges from 0 to 60, optionally 0.1 to 30, and more optionally 0.1 to 9.

When the coating weight is above 23 $mg/cm^2$ (that is, the mass of the positive electrode film layer per unit area plate is above 23 $mg/cm^2$), multiple coating can reduce the material cost of the flexible additive compared to single thick coating, and also, the polyether siloxane can function better without affecting the electrical performance.

In any embodiment, when the flexibility of the plate is determined by half-folding and rolling, the positive electrode plate has a plate breaking length of 0, or the positive electrode plate has a plate breaking length of greater than 0 and less than or equal to 2 mm.

In the present application, the method for determining the flexibility of the plate by half-folding and rolling is as follows: a cold-pressed plate with a size of 10 cm×5 cm is measured out along the direction perpendicular to the machine direction (TD) and folded in half, rolling is performed three times with a 2 kg hand roller, and the breaking length L of the plate is examined.

The method for determining the flexibility grade of the plate by half-folding and rolling is as follows:

$L=0$ means only creases but no light transmission, and the flexibility of the plate is the first grade;

$0<L\leq 2$ mm means weak light transmission, and the flexibility of the plate is the second grade;

2 mm$<L\leq 10$ mm is defined as strong light transmission, which is the third grade of flexibility;

10 mm$<L\leq 20$ mm is defined as slight breaking, which is the fourth grade of flexibility; and $L>20$ mm is defined as breaking, which is the fifth grade of flexibility.

The closer the plate breaking length of the positive electrode plate is to 0, the better the flexibility of the plate is, and the greater the plate breaking length, the worse the flexibility of the plate is.

In the preparation of the positive electrode plate, the cold pressing process will lead to the destruction of the formed hydrogen bonds in the positive electrode plate. However, after the polyether siloxane described in the present application is added, stretching of the flexible backbone of the polyether siloxane can reduce the cold pressing pressure, thereby reducing cracks and reducing the risk of belt breaking, thus improving the flexibility.

In any embodiment, the adhesion increase rate S between the positive electrode film layer and the positive electrode current collector in the positive electrode plate ranges from 2 to 50%, and optionally 10 to 20%, wherein $S=(S2-S1)/S1\times100\%$, in which S2 is the adhesion between the positive electrode film layer and the positive electrode current collector of the positive electrode plate, and S1 is the adhesion between the positive electrode film layer and the positive electrode current collector of the positive electrode plate without the polyether siloxane, wherein the positive electrode plate used in the measurement of S1 is the same as the positive electrode plate used in the measurement of S2, except that the positive electrode plate used in the measurement of S1 does not comprise the polyether siloxane, while the positive electrode plate used in the measurement of S2 comprises the polyether siloxane.

The greater the adhesion between the positive electrode film layer and the positive electrode current collector in the positive electrode plate, the stronger the acting force between the active material and the current collector in the positive electrode plate, otherwise, the poorer the acting force between the active material and the current collector in the plate is, which, in some cases, may result in the release of the active material from the current collector, making it impossible to manufacture a cell. In the present application, the addition of the polyether siloxane can facilitate the acting force between the active material and the current collector.

In any embodiment, the positive electrode film plate in the positive electrode plate has a resistance drop rate Ω ranging from 0 to 18%, and optionally 6 to 15%, wherein $\Omega=(\Omega1-\Omega2)/\Omega1\times100\%$, in which Ω2 is the resistance of the positive electrode film plate, and Ω1 is the resistance of the positive electrode film plate without the polyether siloxane, wherein the positive electrode film plate used in the measurement of Ω1 is the same as the positive electrode film plate used in the measurement of Ω2, except that the positive electrode film plate used in the measurement of Ω1 does not comprise the polyether siloxane, while the positive electrode film plate used in the measurement of Ω2 comprises the polyether siloxane.

The film plate resistance of the plate can also reflect the dispersibility of the slurry. The better the dispersibility, the smaller the film plate resistance Ω of the plate is. For the positive electrode plate described in the present application, after the polyether siloxane is added, the film plate resistance decreases.

A third aspect of the present application provides a secondary battery comprising the positive electrode plate according to the second aspect of the present application or prepared from the positive electrode slurry according to the first aspect of the present application. The energy density of the secondary battery described in the present application is significantly improved. In addition, the overall cost of materials is reduced in preparing the battery.

DETAILED DESCRIPTION OF EMBODIMENTS

Figure 1:
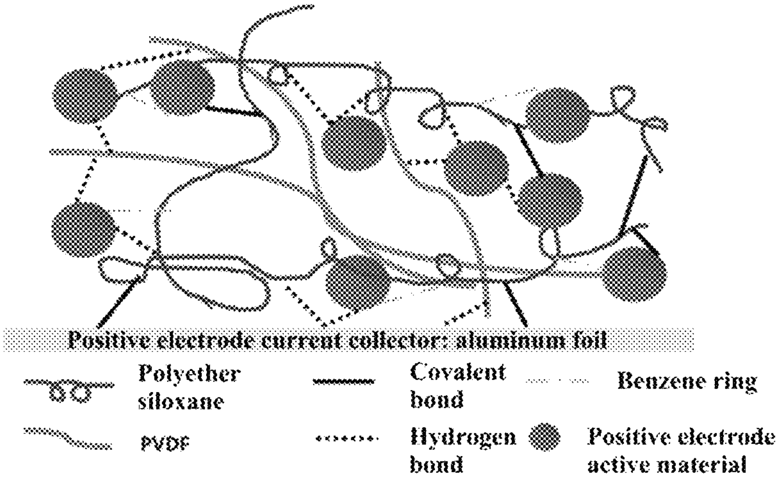
FIG. 1 is a schematic diagram of the principle of interaction between a polyether siloxane and other materials in a positive electrode plate of the present application, where the polyether siloxane is the polyether siloxane described in the present application.

Hereinafter, embodiments of a positive electrode slurry, a positive electrode plate, a negative electrode plate, a secondary battery, a battery module, a battery pack, and an electrical device of the present application are described in detail and specifically disclosed with reference to the accompanying drawings appropriately. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60 to 120 and 80 to 110 are listed for a particular parameter, it should be understood that the ranges of 60 to 110 and 80 to 120 are also contemplated. Additionally, if minimum range values 1 and 2 are listed, and maximum range values 3, 4, and 5 are listed, the following ranges are all contemplated: 1 to 3, 1 to 4, 1 to 5, 2 to 3, 2 to 4 and 2 to 6. In the present application, unless stated otherwise, the numerical range "a-b" denotes an abbreviated representation of any combination of real numbers between a and b, where both a and b are real numbers. For example, the numerical ramie "0 to 5" means that all real numbers between "0 to 5" have been listed in the text, and "0 to 5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the implementations and optional implementations of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

Figure 2:
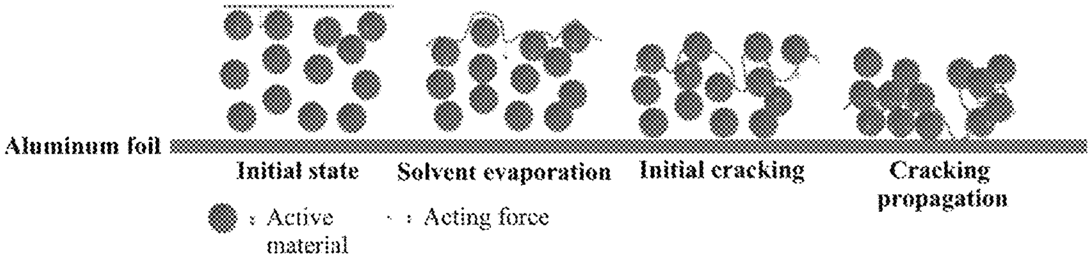
FIG. 2 is a schematic diagram of the process of cracking in coating caused by capillary tension in a positive electrode plate during the coating process that occurs in the prior art, where an active material is a positive electrode active material, and an acting force is the acting force in the coating process, and where the polyether siloxane described in the present application is not used.

For lithium-ion batteries, improving the energy density is a trend, and one of the ways to improve the energy density is to increase the coating weight of a positive electrode plate. However, the inventors of the present application have found that, as shown in FIG. 2, in the coating process of a conventional positive electrode slurry, during or after solvent evaporation, the positive electrode plate will crack due to capillary tension, and the cracking will propagate further, resulting in extensive cracking. In addition, there is also a phenomenon that the edge of the plate is curled in this process. Moreover, belt breaking may occur in the cold pressing process because the positive electrode plate is hard and brittle, and the inner ring may break in the winding process. Based on this, the inventors of the present application have designed and synthesized a flexible polymer material, a polyether siloxane, and by adding the flexible material, the coating weight is increased, the coating quality is improved, the risks in the cold pressing and winding processes are eliminated, and the overall cost of materials used to make batteries is reduced.

(I)

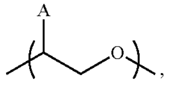

(II)

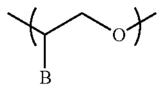

(III)

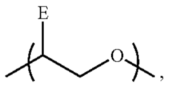

(IV)

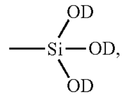

Therefore, a first aspect of the present application provides a positive electrode slurry comprising a positive electrode active material and a polyether siloxane, wherein the polyether siloxane comprises at least the following structural units:

(I)

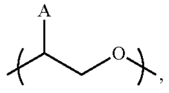

(II)

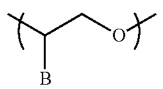

(III)

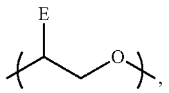

(IV)

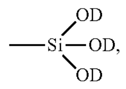

wherein,

D is methyl or ethyl;

A is hydrogen, halogen or haloalkyl, wherein the halogen is optionally fluorine, chlorine or bromine; and optionally, A is hydrogen or fluoromethyl;

B is hydroxyl, R, OR, or ROR', wherein the R and R' are each independently a linear or branched alkyl group containing 1 to 8 carbons; and optionally, B is methyl, ethyl or ethoxymethyl; and E is phenyl, alkyl-substituted phenyl, ether-substituted phenyl or halophenyl, and optionally, E is phenyl or fluorophenyl.

In the polyether siloxane described in the present application, the structural unit (IV) is present as an end group.

Optionally, in some embodiments, the polyether siloxane is formed by polymerizing the following components:

(a) ethylene oxide which is unsubstituted or substituted with halogen or halogenated $C_{1-8}$ alkyl;

(b) ethylene oxide substituted with hydroxy, hydroxyalkyl, R, OR, or ROR', wherein the R and R' are each independently $C_{1-8}$ alkyl, wherein the alkyl in hydroxyalkyl is $C_{1-8}$ alkyl;

(c) ethylene oxide substituted with halophenyl, haloalkylphenyl or phenyl;

(d) triethoxysilane or trimethoxysilane substituted with $C_{1-8}$ alkyl or $C_{1-8}$ alkenyl;

wherein, based on the total molar amount of components (a) to (d), the molar proportion of component (a) is 0 to 75 mol %, and optionally 10 to 40 mol %; the molar proportion of component (b) is 0 to 70 mol %, and optionally 40 to 65 mol %; the molar proportion of component (c) is 5 to 65 mol %; and the molar proportion of component (d) is 4 to 10 mol %, wherein the components (a) and (b) are not both zero.

In some embodiments, optionally, component (a) is selected from ethylene oxide, epifluorohydrin, epichlorohydrin, and epibromohydrin.

In some embodiments, optionally, component (b) is selected from propylene oxide, ethyl glycidyl ether, isopropyl glycidyl ether, butyl glycidyl ether, isopropyl glycidyl ether, epoxybutane, 1,2-epoxybutane, 1,2-epoxypentane, 1,2-epoxyheptane, 1,2-epoxyoctane, 1,2-epoxydecane, 1,2-epoxy-3-methylbutane, and glycidol.

In some embodiments, optionally, component (c) is selected from styrene oxide and phenyl.

In some embodiments, optionally, component (d) is selected from vinyltriethoxysilane.

In the present application, $C_{1-8}$ alkyl is a linear or branched alkyl group containing 1-8 carbons, which may be selected from, for example, methyl, ethyl, propyl, butyl, pentyl, hexyl, heptyl, octyl, isopropyl, isobutyl, tert-butyl, isopentyl, tert-amyl, neopentyl, 2-methylpentyl, 3-methylpentyl, 2,2-dimethylbutyl, 2,3-dimethylbutyl, 2-methylhexyl, 3-methylhexyl, 2,2-dimethylpentyl, 3,3-dimethylpentyl, 2,3-dimethylpentyl, 2,4-dimethylpentyl, 3-ethylpentyl, 2,2,3-trimethylbutyl, 2-methylheptyl, 3-methylheptyl, 4-methylheptyl, 2,2-dimethylhexane, 3,3-dimethylhexane, 2,3-dimethylhexane, 2,4-dimethylhexane, 2,5-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane, 2-methyl-3-ethylpentane, 3-methyl-3-ethylpentane, and 2,2,3,3-tetramethylbutane.

In the present application, CI-8 alkenyl is a linear or branched alkenyl group containing 1-8 carbons, which may include, but is not limited to, vinyl, propenyl, allyl, 1-methylprop-2-en-1-yl, 2-methylprop-2-en-1-yl, but-2-en-1-yl, but-3-en-1-yl, 1-methylbut-3-en-1-yl, and 1-methylbut-2-en-1-yl and the like.

In the present application, the alkyl substituent can be a linear or branched alkyl group containing 1-8 carbons, which is optionally selected from methyl, ethyl, propyl, isopropyl, n-butyl, isobutyl, and tert-butyl. Optionally, the alkyl substitution is mono- or di-substitution. In some embodiments, the alkyl-substituted phenyl group can be selected from, for example, 3,4-dimethylphenyl, 2-methylphenyl, 3,5-dimethylphenyl, and 4-(2-methylpropyl)phenyl.

In the present application, the alkyl group in the haloalkyl group is optionally a linear or branched alkyl group containing 1-8 carbons, which, for example, is optionally selected from methyl, ethyl, propyl, butyl, pentyl, hexyl, heptyl, octyl, isopropyl, isobutyl, tert-butyl, isopentyl, tert-amyl, neopentyl, 2-methylpentyl, 3-methylpentyl, 2,2-dimethylbutyl, 2,3-dimethylbutyl, 2-methylhexyl, 3-methylhexyl, 2,2-dimethylpentyl, 3,3-dimethylpentyl, 2,3-dimethylpentyl, 2,4-dimethylpentyl, 3-ethylpentyl, 2,2,3-trimethylbutyl, 2-methylheptyl, 3-methylheptyl, 4-methylheptyl, 2,2-dimethylhexane, 3,3-dimethylhexane, 2,3-dimethylhexane, 2,4-dimethylhexane, 2,5-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane, 2-methyl-3-ethylpentane, 3-methyl-3-ethylpentane, and 2,2,3,3-tetramethylbutane. The halogen in the haloalkyl group can be selected from fluorine, chlorine, bromine, and iodine.

In the present application, the ether substituent may be a linear or branched alkoxy group containing 1-8 carbons, which is optionally selected from methoxy, ethoxy, propoxy or butoxy. In some embodiments, the ether-substituted phenyl group may be selected from, for example, 4-methoxyphenyl, 3-methoxyphenyl, and the like.

In the present application, the haloalkylphenyl group refers to phenyl substituted with haloalkyl, where the haloalkyl group refers to alkyl substituted with halogen, where the alkyl group is $C_{1-8}$ alkyl.

In the present application, the halophenyl group represents phenyl substituted with halogen. In the present application, the halogen can be selected from fluorine, chlorine, bromine, and iodine. In some embodiments, the halophenyl group may be selected from, for example, 4-fluorophenyl, 2-fluorophenyl, 2,6-difluorophenyl, 4-(trifluoromethyl)phenyl, 4-chlorophenyl, 3-chlorophenyl, 4-bromophenyl, 3-bromophenyl or 2-bromophenyl.

In the polyether siloxane described in the present application, the structural unit (IV) (or the structural unit formed by the component (d)) can ensure the stability and dispersibility of the polymer and improve the strength of the polymer; the structural unit (I) (or the structural unit formed by component (a)) can improve the ability to form hydrogen bonds between the polymer and the surface of positive electrode particles, conductive carbon, and aluminum foil; the structural unit (II) (or the structural unit formed by the component (b)) can extend the branch chain of the molecule to ensure that the polyether siloxane forms covalent bonds with the surface of positive electrode particles, conductive carbon, and the surface of the aluminum foil, so as to ensure that the positive electrode particles do not migrate in the coating process; and the structural unit (III) (or the structural unit formed by component (c)) can improve the rigidity of the polyether siloxane, so that it has a certain strength and hardness, thereby improving the oxidation resistance and electrolyte resistance of the polyether siloxane, and also, the benzene ring interacts with the surface of positive electrode particles to ensure the dispersibility of the polyether siloxane.

Figure 3:
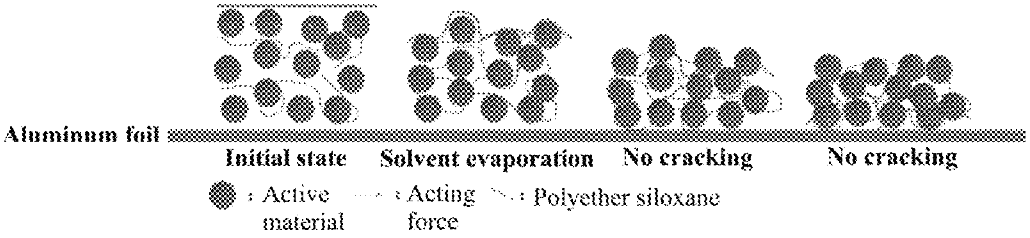
FIG. 3 is a schematic diagram of the positive electrode plate described in the present application without cracking in the coating process, where an active material is a positive electrode active material, and an acting force is the acting force in the coating process, and where the polyether siloxane described in the present application is used.
Figure 4:
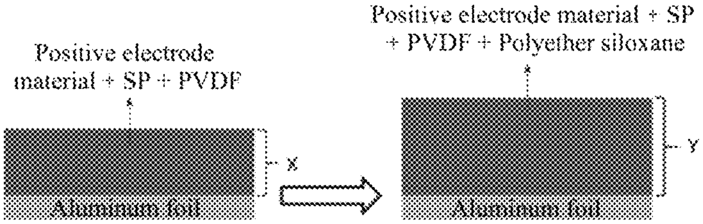
FIG. 4 is a schematic diagram showing an increase in the maximum coating weight per unit area in the positive electrode plate after using the polyether siloxane of the present application, where a positive electrode material represents a positive electrode active material, SP represents a conductive agent used in the positive electrode plate, and PVDF represents a binder used in the positive electrode plate; and where X represents the maximum coating thickness of a positive electrode slurry not comprising the polyether siloxane, and Y represents the maximum coating thickness of a positive electrode slurry comprising the polyether siloxane under the same conditions, and obviously, Y is greater than X.

As shown in FIG. 1, the polyether siloxane described in the present application is a flexible chain with a lone backbone, which not only can form hydrogen bonds with the positive electrode active material and the positive electrode current collector through the structural unit (I) (or the structural unit formed by component (a)), but also can form covalent bonds with the positive electrode active material and the positive electrode current collector through the structural unit (II) (or the structural unit formed by component (b)), and can also interact with the surface of particles of the positive electrode active material through the benzene ring in the structural unit (III) (or the structural unit formed by component (c)). In addition, covalent bonds can also be formed between the polyether siloxanes described in the present application. Therefore, by adding the polyether siloxane described in the present application into the positive electrode slurry, the stability of the positive electrode slurry and the flexibility of the positive electrode plate can be improved, and the dispersibility of each material in the positive electrode plate can be ensured, thereby increasing the coating weight of the positive electrode plate. As shown in FIG. 3, after the polyether siloxane is added, the positive electrode slurry of the present application does not crack in the entire coating process. As shown in FIG. 4, after the polyether siloxane of the present application is added, the maximum coating thickness (weight) in the positive electrode plate is significantly increased.

The polyether siloxane described in the present application can be obtained according to conventional technical means in the art, or can also be prepared using the following steps:

Step (1): a polyether is generated from an alkylene oxide monomer under an alkaline condition, where, optionally, the reaction is carried out in a reaction kettle; optionally, the solvent used is one or more of dimethyl sulfoxide, acetone, and diethyl ether; optionally, a basic material that may be added in the preparation is, for example, NaOH, KOH, or dicyclohexylcarbodiimide; optionally, the reaction temperature of this reaction ranges from to 160° C., and the reaction time ranges from 3 to 7 h; optionally, the stirring speed in the reaction process ranges from 1000 to 2000 Amin; and optionally, after the reaction is completed, a purification step by distillation under reduced pressure is performed.

Step (2): the polyether in step (1) is reacted with a silane coupling agent to generate the polyether siloxane, where, optionally, the reaction is carried out in a reaction kettle; optionally, the silane coupling agent comprises one of vinyltrimethoxysilane and vinyltriethoxysilane; optionally, the reaction temperature of this reaction ranges from 60 to 130° C.; optionally, the reaction time ranges from 2 to 15 h; optionally, stirring is performed in the reaction process, where the stirring time is optionally 1 to 10 h and the stirring speed is optionally 1000 to 2000 r/min; and optionally, after the reaction is completed, a purification step by distillation under reduced pressure is performed.

In some embodiments, the positive electrode slurry described in the present application has a pH ranging from about 6 to 9 at 20 to 60° C. The pH value can be determined by conventional means in the prior art.

In any embodiment of the present application, after the polyether siloxane is added into the positive electrode slurry, the energy density of the resulting lithium-ion battery is significantly improved. In addition, due to the improvement of the positive electrode plate, the used amount of the cell can be saved, thereby reducing the total cost of materials used for preparing the battery.

In some embodiments, the polyether siloxane has a number average molecular weight ranging from 10,000 to 60,000, and optionally 20,000 to 60,000. In other embodiments, the number average molecular weight of the polyether siloxane is optionally selected from the following ranges: 10,000 to 50,000, 20,000 to 50,000, 20,000 to 30,000, or 20,000 to 40,000.

The molecular weight has an influence on the processing performance of the positive electrode plate. When the molecular weight is small, the flexibility of the positive electrode plate is not significantly improved, thus there is still the phenomenon of cracking in coating, and the problems of belt breaking in cold pressing and breaking in winding may occur. If the molecular weight is too small, the stability of the positive electrode slurry is poor, thus the phenomenon of physical gelling is likely to occur, and the resistance of the positive electrode film plate will be deteriorated, which will also have an adverse effect on the battery performance. If the molecular weight is too large, it is unfavorable for the dispersion of the polyether siloxane in the positive electrode slurry. Therefore, the number average molecular weight of the polyether siloxane must be controlled within the above range.

In some embodiments, in the polyether siloxane described in the present application, based on the total molar amount of structural unit (I) to structural unit (IV), the molar proportion of structural unit (I) is 0 to 75 mol %, the molar proportion of structural unit (II) is 0 to 70 mol %, the molar proportion of structural unit (III) is 5 to 65 mol %, and the molar proportion of structural unit (IV) is 4 to 10 mol %, wherein the molar proportions of structural unit (I) and structural unit (II) are not both zero.

Optionally, based on the total molar amount of structural unit (I) to structural unit (IV), the molar proportion of structural unit (I) (or based on the total molar amount of components (a) to (d), the molar proportion of component (a)) can be about 0 mol %, about 5 mol %, about 10 mol %, about 15 mol %, about 17 mol %, about 20 mol %, about 25 mol %, about 26 mol %, about 27 mol %, about 28 mol %, about 29 mol %, about 30 mol %, about 31 mol %, about 32 mol %, about 35 mol %, about 40 mol %, about 45 mol %, about 50 mol %, about 55 mol %, about 60 mol %, about 65 mol %, about 70 mol %, about 72 mol %, or about 75 mol %. Alternatively, the molar proportion of structural unit (I) is within any range composed of any of the above-mentioned values.

Optionally, based on the total molar amount of structural unit (I) to structural unit (IV), the molar proportion of structural unit (II) (or based on the total molar amount of components (a) to (d), the molar proportion of component (b)) can be about 0 mol %, about 5 mol %, about mol %, about 15 mol %, about 17 mol %, about 20 mol %, about 25 mol %, about 30 mol %, about 31 mol %, about 35 mol %, about 40 mol %, about 43 mol %, about 45 mol %, about 50 mol %, about 53 mol %, about 54 mol %, about 55 mol %, about 56 mol %, about 58 mol %, about 60 mol %, about 63 mol %, about 65 mol %, or about 70 mol %. Alternatively, the molar proportion of structural unit (II) is within any range composed of any of the above-mentioned values.

Optionally, based on the total molar amount of structural unit (I) to structural unit (IV), the molar proportion of structural unit (III) (or based on the total molar amount of components (a) to (d), the molar proportion of component (c)) is about 5 mol %, about 6 mol %, about 7 mol %, about 10 mol %, about 11 mol %, about 15 mol %, about 20 mol %, about 24 mol %, about 25 mol %, about 26 mol %, about 30 mol %, about 31 mol %, about 35 mol %, about 40 mol %, about 45 mol %, about 50 mol %, about 55 mol %, about 59 mol %, about 60 mol %, or about 65 mol %. Alternatively, the molar proportion of structural unit (III) is within any range composed of any of the above-mentioned values.

Optionally, based on the total molar amount of structural unit (I) to structural unit (IV), the molar proportion of structural unit (IV) (or based on the total molar amount of components (a) to (d), the molar proportion of component (d)) is about 4 mol %, about 5 mol %, about 6 mol %, about 7 mol %, about 8 mol %, about 9 mol %, or about 10 mol %. Alternatively, the molar proportion of structural unit (IV) is within any range composed of any of the above-mentioned values.

In the present application, "about" a numerical value means a range, i.e., a range of ±3% of the numerical value.

The above molar proportions of the structural units (I) to (IV) (or components (a) to (d)) can ensure that sufficient hydrogen bonds and a suitable amount of covalent bonds are formed between the obtained polyether siloxane and a positive electrode active material, current collector or the like, so as to ensure the stability of the positive electrode plate during the preparation process and the flexibility of the positive electrode plate as well as the dispersibility of each positive electrode material, thereby improving the energy density of the battery.

In some embodiments, the weight ratio of the polyether siloxane to the positive electrode active material ranges from 0.0005 to 0.030, optionally 0.001 to 0.02, more optionally 0.001 to 0.01, and most optionally 0.001 to 0.006.

When the weight ratio of the polyether siloxane to the positive electrode active material is too small, the positive electrode plate will crack at high coating weight, and when the ratio is too large, the battery performance will be adversely affected.

In some embodiments, the weight ratio of lithium element to silicon element in the positive electrode slurry ranges from 60 to 3875, optionally 60 to 1950, more optionally 90 to 1950, and most optionally 380 to 1950.

In some embodiments, in the positive electrode slurry, only the polyether siloxane contains silicon and only the active material contains lithium, and in this case, the weight ratio of lithium element to silicon element represents the weight ratio of the positive electrode active material to the polyether siloxane. Therefore, in view of this, the present application further limits the weight ratio of lithium element to silicon element. Similarly, when the weight ratio of lithium element to silicon element is too large, the positive electrode plate will crack at high coating weight, and when the weight ratio is too small, the battery performance will be adversely affected.

In some embodiments, the positive electrode active material is selected from at least one of lithium iron phosphate, lithium iron manganese phosphate, lithium manganese oxide, lithium cobalt oxide, lithium nickel cobalt manganese oxide, lithium nickel cobalt aluminum oxide, lithium nickel oxide or a mixture thereof.

Theoretically, for the positive electrode of a secondary battery, a positive electrode active material for batteries well known in the art can be used in the present application. As an example, the positive electrode active material may include at least one of the following materials: lithium-containing phosphates of an olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

However, the inventors of the present application have found that when the positive electrode active material is at least one of lithium iron phosphate, lithium iron manganese phosphate, lithium manganese oxide, lithium cobalt oxide, lithium nickel cobalt manganese oxide, lithium nickel cobalt aluminum oxide, lithium nickel oxide or a mixture thereof, the addition of the polyether siloxane can better achieve the effects of improving the flexibility of the plate, increasing the coating weight of the plate and the like.

In some embodiments, the positive electrode slurry has a stability factor of $0<V\leq 6$, and optionally $0<V\leq 4$, where $V=(V2-V1)/V1\times 100\%$, in which V1 is the initial viscosity of the positive electrode slurry, namely, the viscosity hour after preparation, and V2 is the viscosity of the positive electrode slurry 48 hours after preparation, wherein the positive electrode slurry used in the measurement of V1 and the positive electrode slurry used in the measurement of V2 are the same batch of positive electrode slurry.

In the present application, the viscosity is measured by a viscometer (for example, model DVESLVTJ0, a viscometer purchased from Brookfield) in the range of room temperature (20 to 35° C.). The closer the viscosity of the positive electrode slurry 48 hours after preparation to the initial viscosity, the more stable the slurry viscosity is. When the stability factor $V\leq 6$, it is determined that the viscosity of the slurry is stable; and when $V>6$, it is determined that the viscosity of the slurry is not stable. It is measured that, after the polyether siloxanes within the scope of the present application are added, the stability factors of the positive electrode slurries are all $0<V\leq 6$, and optionally $0<V\leq 4$, while when certain other polyether siloxanes in the prior art are used, the stability factors are generally greater than 6.

A second aspect of the present application provides a positive electrode plate comprising a positive electrode current collector; and a positive electrode film layer on at least one surface of the positive electrode current collector, the positive electrode film layer comprising the positive electrode slurry described in the first aspect of the present application. As mentioned above, the present application has realized an increase of the coating weight on the positive electrode plate by adding the polyether siloxane. This is also reflected in an increase in the maximum weight of the positive electrode film layer per unit plate. In some embodiments, the mass of the positive electrode film layer per unit area plate ranges from 13 to 45 $mg/cm^2$, optionally 20 to 43 $mg/cm^2$, more optionally 22 to 33 $mg/cm^2$, and most optionally 25 to 31 $mg/cm^2$, where the mass is the mass of the positive electrode film layer on a single surface of the plate. If there is a positive electrode film layer on both surfaces of the positive electrode plate, the mass range of the positive electrode film layers per unit area plate is twice the above range, that is, the mass range is 26 to 90 $mg/cm^2$, optionally 40 to 86 $mg/cm^2$, more optionally 44 to 66 $mg/cm^2$, and most optionally 50 to 62 $mg/cm^2$, where the mass is the mass of the positive electrode film layer on both surfaces of the plate.

In some embodiments, by adding the polyether siloxane, the coating weight (single surface) of the positive electrode plate described in the present application can reach a maximum of 45 $mg/cm^2$, optionally a maximum of 23 to 45 $mg/cm^2$, and more optionally a maximum of 28 to 43 $mg/cm^2$.

When the weight of the positive electrode film layer per unit area plate is too small, the uniformity of the plate is poor; and when the weight of the positive electrode film layer per unit area plate is too large, cracking will occur in the coating process of the plate, making it impossible to continue production. In the present application, the weight of the positive electrode film layer per unit area plate is limited to the above range, so as to ensure that the best effect can be achieved within this range.

The positive electrode current collector has two surfaces opposite in its own thickness direction, and the positive electrode film layer is provided on either or both of the two opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In the positive electrode plate, the mass content of the positive electrode active material in the positive electrode film layer is 90 to 97%, based on the positive electrode film layer. This content can be measured by EDS. When the mass content is too small, the prepared battery has low energy density, which cannot meet the battery capacity requirement; and when the mass content is too large, the binder and the conductive agent are insufficient, resulting in poor battery performance.

In the positive electrode plate, the mass content of the binder in the positive electrode film layer is 2 to 5%, based on the total mass of the positive electrode film layer. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin. Existing conventional positive electrode plates using a binder with a specific crystallinity or a similar crystallinity are brittle after coating and drying to form a film, and are prone to cracking under the action of stress, while the positive electrode plate of the present application using a binder also having this crystallinity does not crack.

In some embodiments, the positive electrode film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: dispersing the above-mentioned components for preparing the positive electrode plate, for example, positive electrode active material, the polyether siloxane additive described in the present application, conductive agent, binder and any other components, in a solvent (e.g. N-methylpyrrolidone) to form a positive electrode slurry; and coating a positive electrode current collector with the positive electrode slurry, followed by the procedures such as drying and cold pressing, so as to obtain the positive electrode plate.

The positive electrode plate described in the present application has very good flexibility, and the coating weight is significantly improved, for example, the coating weight of the positive electrode can be increased by about 36%. The application of the positive electrode plate in a secondary battery, for example, directly adding into the positive electrode slurry during preparation, can improve the energy density of the battery.

In some embodiments, the weight ratio of lithium element to silicon element in the positive electrode plate corresponds to the weight ratio of lithium element to silicon element in the positive electrode slurry, that is, the weight ratio ranges from 60 to 3875, optionally to 1950, more optionally 90 to 1950, and most optionally 380 to 1950. The effect of the weight ratio of lithium element to silicon element is as described above. The weights of lithium element and silicon element can be measured by energy dispersive spectroscopy (EDS) or inductively coupled plasma spectroscopy (ICP).

In some embodiments, the positive electrode film layer comprises two sublayers which are parallel to the positive electrode current collector and overlap each other, wherein the ratio of the weight content of silicon in the sublayer closest to the positive electrode current collector to the weight content of silicon in the sublayer farthest from the positive electrode current collector ranges from 0 to 60, optionally 0.1 to 30, and more optionally 0.1 to 9.

Optionally, when preparing the positive electrode film layer with two sublayers, two positive electrode slurries containing different amounts of polyether siloxane are first prepared, and then one slurry is coated on the current collector and dried, after which another layer of slurry is coated and dried.

The thicknesses of the two sublayers can be the same or different. The thickness of the sublayer closest to the positive electrode current collector may be smaller or greater than the thickness of the sublayer farthest from the positive electrode current collector. For example, the thicknesses of the two sublayers can be measured on the cross-section by an ion polisher combined with SEM, and when inspecting a prepared positive electrode film layer, elemental analysis of the cross-section can be performed by an ion polisher, and the silicon content in the sublayer closest to the positive electrode current collector and the silicon content in the sublayer farthest from the positive electrode current collector can be detected by a method combined with EDS.

Under the condition of the same content of polyether siloxane, when preparing the positive electrode plate, the maximum coating weight per unit area plate achieved by multi-layer coating with the positive electrode slurry is greater than that achieved by single-layer coating with the positive electrode slurry. For example, when the positive electrode slurry is coated on one surface of the positive electrode current collector and the single coating weight is 36 $mg/cm^2$, the plate is prone to cracking due to the action of capillary tension and stress in the coating process, so the coating weight of 36 $mg/cm^2$ cannot be used. If the coating is performed in two times, two positive electrode slurries are prepared, where each slurry contains different amounts of polyether siloxane, and the specific content of polyether siloxane in each layer meets the aforementioned conditions. The first layer is coated with a coating weight of 18 $mg/cm^2$, and the plate does not crack due to the slight action of capillary tension and stress during coating; and then, when continuing to coat the second layer with a coating weight of 18 $mg/cm^2$ on the basis of the first layer, the plate still does not crack due to the action of polyether siloxane, so a coating weight of 36 $mg/cm^2$ can be used. Therefore, coating in two times can increase the maximum coating weight of the positive electrode slurry per unit area plate, thereby increasing the energy density of the battery.

In some embodiments, when the flexibility of the plate is determined by half-folding and rolling, the positive electrode plate has a plate breaking length of 0, or the positive electrode plate has a plate breaking length of greater than 0 and less than or equal to 2 mm.

In the present application, the method for determining the flexibility of the plate by half-folding and rolling is as follows: a cold-pressed plate with a size of 10 cm×5 cm is measured out along the direction perpendicular to the machine direction (TD) and folded in half, rolling is performed three times with a 2 kg hand roller, and the breaking length L of the plate is examined.

The method of determining the flexibility grade is as follows:

$L=0$ means only creases but no light transmission, and the flexibility of the plate is the first grade;

$0<L\leq 2$ mm means weak light transmission, and the flexibility of the plate is the second grade;

2 mm$<L\leq 10$ mm is defined as strong light transmission, which is the third grade of flexibility;

10 mm$<L\leq 20$ mm is defined as slight breaking, which is the fourth grade of flexibility; and $L>20$ mm is defined as breaking, which is the fifth grade of flexibility.

The closer the plate breaking length of the positive electrode plate to 0, the better the flexibility of the plate is; and the greater the plate breaking length, the worse the flexibility of the plate is.

In the preparation of the positive electrode plate, the cold pressing process will lead to the destruction of the formed hydrogen bonds in the positive electrode plate and the stretching of the flexible backbone. However, after the polyether siloxane described in the present application is added, the cold pressing pressure can be reduced, thereby reducing cracks and reducing the risk of belt breaking, thus improving the flexibility.

In some embodiments, the adhesion increase rate S between the positive electrode film layer and the positive electrode current collector in the positive electrode plate ranges from 2 to 50%, and optionally 10 to 20%, wherein $S=(S2-S1)/S1\times 100\%$, in which S2 is the adhesion between the positive electrode film layer and the positive electrode current collector of the positive electrode plate, and S1 is the adhesion between the positive electrode film layer and the positive electrode current collector of the positive electrode plate without the polyether siloxane, wherein the positive electrode plate used in the measurement of S1 is the same as the positive electrode plate used in the measurement of S2, except that the positive electrode plate used in the measurement of S1 does not comprise the polyether siloxane, while the positive electrode plate used in the measurement of S2 comprises the polyether siloxane.

In the present application, the determination method for S1 and S2 is as follows:

a plate to be tested is measured out along the direction perpendicular to the machine direction (TD), and a specimen with a size of 20 mm (width)×(100 to 160) mm (length) is cut out, and then a special double-sided tape with a size of 20 mm (width)×(90 to 150) mm (length) is attached to a steel sheet. After attaching the cut-out plate specimen to the double-sided tape, rolling is performed three times in the same direction with a 2 Kg hand roller. A tensile machine is used to test the adhesion of the plate, where the plate not comprising polyether siloxane has an adhesion of S1, and the plate comprising polyether siloxane has an adhesion of S2.

For example, a 2 Kg hand roller purchased from Guangdong Iris Technology Co., Ltd. can be used in the test, where the wheel width is 45 mm, the wheel diameter is 83 mm, the rubber thickness is 6 mm, and the rubber hardness is HS80±5.

For example, a tensile machine of model 336 purchased from INSTRON, USA can be used in the test.

The greater the adhesion between the positive electrode film layer and the positive electrode current collector in the positive electrode plate, the stronger the acting force between the active material and the current collector in the positive electrode plate, otherwise, the poorer the acting force between the active material and the current collector in the plate is, which, in some cases, may result in the release of the active material from the current collector, making it impossible to manufacture a cell. In the present application, the addition of the polyether siloxane can facilitate the acting force between the active material and the current collector.

In some embodiments, the positive electrode film plate in the positive electrode plate has a resistance drop rate Ω ranging from 0 to 18%, and optionally 6 to 15%, wherein $\Omega=(\Omega 1-\Omega 2)/\Omega 1\times 100\%$, in which Ω2 is the resistance of the positive electrode film plate, and Ω1 is the resistance of the positive electrode film plate without the polyether siloxane, wherein the positive electrode film plate used in the measurement of Ω1 is the same as the positive electrode film plate used in the measurement of Ω2, except that the positive electrode film plate used in the measurement of Ω1 does not comprise the polyether siloxane, while the positive electrode film plate used in the measurement of Ω2 comprises the polyether siloxane.

In the present application, Ω2 and Ω1 are measured with a film plate resistance tester of model BER1100 purchased from Yuanneng Technology (Xiamen) Co., Ltd., and the specific measurement method is as follows:

a plate with an area of 4 cm×25 cm (longitudinal) is taken out along the mechanical stretching direction (MD), a current collector of the tested plate is placed in the middle of a probe, a run button is clicked and then a reversing valve is turned downward, and after 15 seconds, data is collected automatically; and the process is repeated as above for another point until 20 points are tested; and the respectively obtained resistances of 20 points are averaged to obtain the Ω2 and Ω1 values respectively.

The film plate resistance of the plate can reflect the dispersibility of the slurry. The better the dispersibility, the smaller the film plate resistance Ω of the plate is. For the positive electrode plate described in the present application, after the polyether siloxane is added, the film plate resistance is decreased by about 0 to 18% and optionally about 6 to 15% compared to the conventional positive electrode plate, which means that the dispersion of each material in the positive electrode plate prepared after adding polyether siloxane is improved.

A third aspect of the present application provides a secondary battery comprising the positive electrode plate according to the second aspect of the present application or prepared from the positive electrode slurry according to the first aspect of the present application. The energy density of the secondary battery described in the present application is significantly improved. In addition, the overall cost of materials is reduced in preparing the battery.

The secondary battery, battery module, battery pack, and power consuming device of the present application are described below.

Secondary Battery

Typically, a secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Positive Electrode Plate]

The positive electrode plate described in the second aspect of the present application or prepared from the positive electrode slurry described in the first aspect of the present application is used.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: the above-mentioned components for preparing the negative electrode plate, such as negative electrode active material, conductive agent, binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be selected from at least one of solid electrolyte and liquid electrolyte (i.e., electrolyte solution).

In some embodiments, an electrolyte solution is used as the electrolyte. The electrolyte solution comprises an electrolyte salt and a solvent.

In some embodiments, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate borate (LiDFOB), lithium dioxalate borate (LiBOB), lithium difluorophosphate ($LiPO_2F_2$), lithium bisoxalatodifluorophosphate (LiDFOP) and lithium tetrafluorooxalate phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MIF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS) and diethyl sulfone (ESE).

In some embodiments, the electrolyte solution may optionally comprise an additive. For example, the additive may include a negative electrode film-forming additive, a positive electrode film-forming additive, and also an additive that can improve certain performance of the battery, such as an additive to improve the overcharge performance of a battery, an additive to improve the high temperature performance of a battery, and an additive to improve the low temperature performance of a battery, etc.

[Separator]

In some embodiments, the secondary battery further comprises a separator. The separator is provided between the positive electrode plate and the negative electrode plate, and functions for separation. The type of the separator is not particularly limited in the present application, and any well known porous-structure separator with good chemical stability and mechanical stability may be selected.

In some embodiments, the material of the separator can be selected from at least one of glass fibers, a non-woven, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

[Outer Package]

In some embodiments, the secondary battery may include an outer package for encapsulating the positive electrode plate, the negative electrode plate and the electrolyte. As an example, the positive electrode plate, the negative electrode plate and the separator may be laminated or wound to form a laminated or wrapped-structure cell, which is encapsulated within the outer package; and the electrolyte may be an electrolyte solution which is infiltrated into the cell. The number of the cells in the secondary battery may be one or more, and can be adjusted according to the requirements.

In one embodiment, the present application provides an electrode assembly. In some embodiments, the positive electrode plate, the negative electrode plate and the separator can be made into the electrode assembly by a winding process or a lamination process. The outer package can be used to encapsulate the above-mentioned electrode assembly and electrolyte.

In some embodiments, the outer package of the secondary battery may be a soft bag, such as a pouch-type soft bag. The material of the soft bag can be a plastic, for example, comprising one or more of polypropylene (PP), polybutylene terephthalate (PBT), polybutylene succinate (PBS), etc. In some embodiments, the outer package of the secondary battery can be a hard shell, for example, a hard plastic shell, an aluminum shell, a steel shell, etc.

Preparation Method of Secondary Battery

In one embodiment, the present application provides a preparation method of a secondary battery, wherein a negative electrode plate described in the present application or a negative electrode plate prepared according to the method described in the present application is used.

The preparation of a secondary battery may further comprise the step of assembling the negative electrode plate, a positive electrode plate and an electrolyte into a secondary battery. In some embodiments, the positive electrode plate, the separator, and the negative electrode plate can be wound or laminated in order, such that the separator is located between the positive electrode plate and the negative electrode plate and functions for isolation to obtain a cell. The cell is placed in an outer package, and an electrolyte solution is injected, and the outer package is sealed to obtain a secondary battery.

In some embodiments, the preparation of a secondary battery may further comprise the step of preparing a positive electrode plate. As an example, a positive electrode active material, a conductive agent and a binder can be dispersed into a solvent (e.g., N-methylpyrrolidone, NMP) to form a uniform positive electrode slurry; and the positive electrode slurry is coated onto a positive electrode current collector, and is then subjected to procedures such as drying and cold pressing, so as to obtain the positive electrode plate.

In some embodiments, the preparation of a secondary battery comprises the step of preparing a negative electrode plate according to the method described in the present application.

The shape of the secondary battery is not particularly limited in the present application, and may be cylindrical, square or of any other shape.

In some embodiments, the present application provides a power consuming device, a battery module, or a battery pack, wherein the power consuming device, the battery module, or the battery pack includes a secondary battery as described in the present application or a secondary battery prepared according to the method described in the present application.

In some embodiments, the secondary battery can be assembled into a battery module, and the number of the secondary batteries contained in the battery module may be one or more, and the specific number can be selected by those skilled in the art according to the application and capacity of the battery module.

In some embodiments, the above battery module may also be assembled into a battery pack, the number of the battery modules contained in the battery pack may be one or more, and the specific number can be selected by those skilled in the art according to the application and capacity of the battery pack.

In addition, the present application further provides a power consuming device. The power consuming device comprises at least one of the secondary battery, battery module, or battery pack provided by the present application. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto. As another example, the device may be a mobile phone, a tablet, a laptop computer, etc. The device is generally required to be thin and light, and may use a secondary battery as a power source. As for the power consuming device, the secondary battery, battery module or battery pack can be selected according to the usage requirements thereof.

Therefore, the present application provides a battery module comprising the secondary battery described in the present application.

In addition, the present application further provides a battery pack comprising the above battery module.

The present application further provides a power consuming device comprising at least one of the secondary battery, the battery module, or the battery pack described in the present application.

EXAMPLES

The present application will be described in detail below by means of examples, which are non-limiting.

Example 1

Step 1: Preparation of Polyether Siloxane

1) A polyether was generated from a precursor 1, a precursor 2, and a precursor 3 (see Table 1 for specific types and amounts) under an alkaline condition, and the reaction was stopped as the number average molecular weight of the polyether reached 2 w (i.e., 20,000); and
2) the polyether prepared in step 1) was reacted with a silane coupling agent (see Table 1 for specific types and amounts) to generate a polyether siloxane, and after the reaction was completed, filtration and dialysis were performed to obtain a polyether siloxane with a number average molecular weight cut-off of 1 w-3 w (i.e., 10000-30000).

Step 2: Preparation of Positive Electrode Slurry

A positive electrode active material (lithium iron phosphate), a conductive agent (conductive carbon black Super P), and a binder PVDF were mixed for 30 min. The resulting mixture was then added into NMP and stirred for 180 min to disperse uniformly. Finally, the polyether siloxane prepared in step 1 (see Table 2 for the specific amount) was added, and it was fully stirred for 60 min to form a uniform positive electrode slurry.

Step 3: Preparation of Positive Electrode Plate

The positive electrode slurry was applied to the surface of an aluminum foil of a positive electrode current collector, and after coating, it was dried and cold-pressed to obtain a positive electrode plate. Through a series of performance tests for the positive electrode plate (mainly to test whether the plate is broken, see the test method for the breaking length of the positive electrode plate described herein, and the maximum weight coated as there is no breaking is the maximum coating weight per unit area), a maximum coating weight per unit area of 30 $mg/cm^2$ was obtained.

Step 4: Preparation of Negative Electrode Plate

A negative electrode active material (graphite), a conductive agent (Super P), a binder (SBR), and a thickener (CMC) were fully stirred and mixed in an appropriate amount of deionized water in a mass ratio of 96.2:0.8:1.8:1.2 to form a uniform negative electrode slurry. The negative electrode slurry was applied to both surfaces of a copper foil of a negative electrode current collector, followed by drying and cold pressing, to obtain a negative electrode plate.

Step 5: Preparation of Electrolyte Solution

Ethylene carbonate (EC), ethyl methyl carbonate (EMC), and diethyl carbonate (DEC) were mixed in a volume ratio of 1:1:1, and then $LiPF_6$ was uniformly dissolved in the above solution to obtain an electrolyte solution, where the concentration of $LiPF_6$ was 1 mol/L.

Step 6: Separator

A polyethylene (PE) film was used.

Step 7: Preparation of Secondary Battery

The above positive electrode plate, separator, and negative electrode plate were laminated in order, followed by winding, to obtain an electrode assembly, and the electrode assembly was put into an outer package and the above electrolyte solution was added in, followed by processes such as encapsulating, standing, forming, and aging, to obtain a secondary battery of Example 1. The outer package was selected as a hard-shell housing with a length×width×height=148 mm×28.5 mm×97.5 mm.

Examples 2 to 19 and Comparative Example 1

The process was similar to Example 1, except that the raw materials and amounts as shown in Table 1 and Table 2 were used and that the number average molecular weight ranges of polyether siloxane as shown in Table 4 to Table 6 were selected, where no polyether siloxane was used in Comparative Example 1.

Example 21

Refer to Example 1 for the preparation processes of steps 1 and 4 to 7, and the number average molecular weight ranges of polyether siloxane as shown in Table 7 were selected.

The preparation processes of steps 2 to 3 were changed as follows:

Step 2: Preparation of Positive Electrode Slurry 3134.63 g of a positive electrode active material (lithium iron phosphate), 32.5 g of a conductive agent (Super P), and 81.25 g of a binder PVDF were mixed for 30 min. The resulting mixture was then added to 1750 g of a NMP solvent and stirred for 180 min for uniform dispersion. Finally, 1.63 g of the polyether siloxane prepared in step 1 was added, and the mixture was fully stirred for 60 min to form a uniform positive electrode slurry 1.

3131.38 g of a positive electrode active material (lithium iron phosphate), 32.5 g of a conductive agent (Super P), and 81.25 g of a binder PVDF were mixed for 30 min. The resulting mixture was then added to 1750 g of a NMP solvent and stirred for 180 min for uniform dispersion. Finally, 14.63 g of the polyether siloxane prepared in step 1 was added, and the mixture was fully stirred for 60 min to form a uniform positive electrode slurry 2.

Step 3: Preparation of Positive Electrode Plate

The positive electrode slurry 1 in step 2 was applied to the surface of an aluminum foil of a positive electrode current collector, and after drying, the positive electrode slurry 2 was applied to the surface of the dried slurry 1, where the coating thicknesses of the positive electrode slurry 1 and the positive electrode slurry 2 were kept the same. Through a series of performance tests for the positive electrode plate (mainly to test whether the plate is broken, see the test method for the breaking length of the positive electrode plate described herein, and the maximum weight coated as there is no breaking is the maximum coating weight per unit area), a total coating weight per unit area was 31 $mg/cm^2$.

Example 20

The difference from Example 21 was that the positive electrode slurry 1 did not contain polyether siloxane, and other preparation processes were similar to Example 21. For specific method parameters, see Table 1 and Table 3, and the number average molecular weight ranges of polyether siloxane as shown in Table 7 were selected.

Examples 22 to 26

The preparation process was similar to that of Example 21, except that the raw materials and amounts as shown in Table 1 and Table 3 were used and that the number average molecular weight ranges of polyether siloxane as shown in Table 8 were selected.

In the present application, the positive electrode slurry was applied to both surfaces of the positive electrode current collector in the positive electrode plate in all Examples and Comparative Examples, namely, by double-sided coating.

See Tables 1 to 3 for the materials and amounts used in the preparation in Examples 1 to 26.

TABLE 1

Raw materials and amounts used in the preparation of polyether siloxanes in Examples 1 to 26

| Example preparation | Precursor 1 | Grams used | Precursor 2 | Grams used | Precursor 3 | Grams used | Silane coupling agent | Grams used |
|---|---|---|---|---|---|---|---|---|
| Example 1 | Ethylene oxide | 4400 | Propylene oxide | 11600 | Styrene oxide | 4800 | Vinyl-triethoxy-silane | 3615 |
| Example 2 | Epifluoro-hydrin | 7600 | Ethyl glycidyl ether | 20400 | (±)-4-Fluorostyrene epoxide | 5520 | Vinyltriethoxysilane | 5709 |
| Example 3 | Ethylene oxide | 1980 | Propylene oxide | 2610 | Styrene oxide | 5400 | Vinyl-triethoxy-silane | 1713 |
| Example 4 | Ethylene oxide | 13200 | Propylene oxide | 29000 | Styrene oxide | 12000 | Vinyl-triethoxy-silane | 8945 |
| Example 5 | Ethylene oxide | 7920 | Propylene oxide | 17400 | Styrene oxide | 21600 | Vinyl-triethoxy-silane | 7612 |
| Example 6 | Ethylene oxide | 880 | Propylene oxide | 2900 | Styrene oxide | 600 | Vinyl-triethoxy-silane | 761 |
| Example 7 | Ethylene oxide | 17600 | Propylene oxide | 46400 | Styrene oxide | 12000 | Vinyl-triethoxy-silane | 13322 |
| Example 8 | Ethylene oxide | 10560 | Propylene oxide | 5800 | Styrene oxide | 4800 | Vinyl-triethoxy-silane | 3616 |
| Example 9 | Ethylene oxide | 4400 | Propylene oxide | 5800 | Styrene oxide | 12000 | Vinyl-triethoxy-silane | 3615 |
| Example 10 | Ethylene oxide | 2200 | Propylene oxide | 2900 | Styrene oxide | 20400 | Vinyl-triethoxy-silane | 3615 |
| Example 11 | Ethylene oxide | 0 | Propylene oxide | 11600 | Styrene oxide | 12000 | Vinyl-triethoxy-silane | 3615 |
| Example 12 | Ethylene oxide | 13200 | Propylene oxide | 0 | Styrene oxide | 12000 | Vinyl-triethoxy-silane | 3615 |
| Examples 13 to 26 | Ethylene oxide | 4400 | Propylene oxide | 11600 | Styrene oxide | 4800 | Vinyl-triethoxy-silane | 3615 |

TABLE 2

Materials and amounts used in the preparation of positive electrode slurries in Examples 1 to 19

| Example no. | Positive electrode active material | Grams used | Grams of polyether siloxane used |
|---|---|---|---|
| Example 1 | Lithium iron phosphate | 3120.00 | 16.25 |
| Example 13 | Lithium iron phosphate | 3134.63 | 1.63 |
| Example 14 | Lithium iron phosphate | 3038.75 | 97.50 |
| Example 15 | Lithium iron phosphate | 3133.00 | 3.25 |
| Example 16 | Lithium iron phosphate | 3071.25 | 65.00 |
| Example 17 | Lithium iron phosphate | 3116.75 | 19.50 |
| Example 18 | Lithium iron phosphate | 3135.28 | 0.98 |
| Example 19 | Lithium iron phosphate | 3006.25 | 130.00 |

32.5 g of the conductive agent super P, 81.25 g of the binder PVDF and 1750 g of the solvent NMP were used in the preparation of positive electrode slurries in Example 1 and Example 13 to Example 19. The materials and amounts used in the preparation of positive electrode slurries in Examples 1 to 12 were the same as those in Example 1.

TABLE 3

Materials and amounts used in the preparation of positive electrode slurry of each sublayer in Examples 20 to 26

| Example no. | Positive electrode film layer | Positive electrode active material | Grams used | Grams of polyether siloxane used |
|---|---|---|---|---|
| Example 1 | Single layer | Lithium iron phosphate | 3120.00 | 16.25 |
| Example 20 | Sublayer closer to the current collector | Lithium iron phosphate | 3136.25 | 0.00 |
| | Sublayer farthest from the current collector | Lithium iron phosphate | 3120.00 | 16.25 |
| Example 21 | Sublayer closer to the current collector | Lithium iron phosphate | 3134.63 | 1.63 |

TABLE 3-continued

Materials and amounts used in the preparation of positive electrode slurry of each sublayer in Examples 20 to 26

| Example no. | Positive electrode film layer | Positive electrode active material | Grams used | Grams of polyether siloxane used |
|---|---|---|---|---|
| | Sublayer farthest from the current collector | Lithium iron phosphate | 3131.38 | 14.63 |
| Example 22 | Sublayer closer to the current collector | Lithium iron phosphate | 3134.63 | 8.13 |
| | Sublayer farthest from the current collector | Lithium iron phosphate | 3121.63 | 8.13 |
| Example 23 | Sublayer closer to the current collector | Lithium iron phosphate | 3128.13 | 14.63 |
| | Sublayer farthest from the current collector | Lithium iron phosphate | 3128.13 | 1.63 |
| Example 24 | Sublayer closer to the current collector | Lithium iron phosphate | 3121.63 | 94.41 |
| | Sublayer farthest from the current collector | Lithium iron phosphate | 3134.63 | 3.09 |
| Example 25 | Sublayer closer to the current collector | Lithium iron phosphate | 3041.84 | 96.20 |
| | Sublayer farthest from the current collector | Lithium iron phosphate | 3133.16 | 1.63 |
| Example 26 | Sublayer closer to the current collector | Lithium iron phosphate | 3040.05 | 113.75 |
| | Sublayer farthest from the current collector | Lithium iron phosphate | 3134.63 | 1.63 |

IV. Performance Evaluation for Positive Electrode Slurry and Positive Electrode Plate Testing of Slurry Parameters 1. Stability of Positive Electrode Slurry The stability of a positive electrode slurry is evaluated by the following method:

the stability factor of a positive electrode slurry is expressed as V, and V=(V2−V1)/V1, where V1 is the initial viscosity of a fresh positive electrode slurry, and V2 is the viscosity of the above fresh positive electrode slurry 48 hours after preparation.

The viscosities of the above fresh positive electrode slurry and the slurry after standing for 48 hours is measured by a DVESLVTJ0 viscometer (manufactured by Brookfield) at room temperature (20-35° C.), and it is specified that: when $V \leq 6$, the viscosity of the slurry is determined to be stable; and when $V > 6$, the viscosity of the slurry is determined to be not stable.

2. Weight Ratio of Lithium Element to Silicon Element in Positive Electrode Slurry The test methods for the weight ratio of silicon element to lithium element in a positive electrode slurry and the weight ratio of polyether siloxane to positive electrode active material in the positive electrode slurry are as follows:

this test uses the instrument Thermo Fisher Scientific ICAP7400;

and a certain weight of the above slurry is dried, and the obtained dry powder is tested by ICP-OES (plasma emission spectrometer) to obtain the weight ratio of silicon element to lithium element in the positive electrode slurry; and then the weight ratio of polyether siloxane to positive electrode active material in the slurry is further calculated from the weight ratio of silicon element to lithium element.

The weight ratio of silicon element to lithium element in the positive electrode slurry and the weight ratio of polyether siloxane to positive electrode active material in the positive electrode slurry are equivalent to the weight ratio of silicon element to lithium element in the positive electrode plate and the weight ratio of polyether siloxane to positive electrode active material in the positive electrode plate.

Testing for Parameters of Positive Electrode Plate

1. Testing for Breaking Length of Positive Electrode Plate

The flexibility of the plate is determined by half-folding and rolling, that is, a cold-pressed plate with a size of 10 cm×5 cm is measured out along the direction perpendicular to the machine direction (TD) and folded in half, rolling is performed three times with a 2 kg hand roller, and the breaking length L of the plate is examined.

The flexibility grade is determined according to the following method:

$L=0$ means only creases but no light transmission, and the flexibility of the plate is the first grade;

$0<L\leq 2$ mm means weak light transmission, and the flexibility of the plate is the second grade;

2 mm$<L\leq 10$ mm is defined as strong light transmission, which is the third grade of flexibility;

10 mm$<L\leq 20$ mm is defined as slight breaking, which is the fourth grade of flexibility; and $L>20$ mm is defined as breaking, which is the fifth grade of flexibility.

2. Testing for Adhesion Increase Rate of Positive Electrode Plate

The adhesion increase rate of a positive electrode slurry is evaluated by the following method:

the adhesion increase rate of the positive electrode plate is expressed as S, and S=(S2−S1)/S1×100%, where S2 is the adhesion between a positive electrode film layer and a positive electrode current collector of the positive electrode plate of the present application, and S1 is the adhesion between the positive electrode film layer and the positive electrode current collector of the positive electrode plate without the polyether siloxane, wherein the positive electrode plate used in the measurement of S1 is the same as the positive electrode plate used in the measurement of S2, except that the positive electrode plate used in the measurement of S1 does not comprise the polyether siloxane, while the positive electrode plate used in the measurement of S2 comprises the polyether siloxane.

This test uses a 2 Kg press roller purchased from Guangdong Iris Technology Co., Ltd., where the wheel width is 45 mm, the wheel diameter is 83 mm, the rubber thickness is 6 mm, and the rubber hardness is HS80±5.

This test uses a tensile machine of model 336 purchased from INSTRON, USA.

The determination method for S1 and S2 is as follows:

a plate to be tested is measured out along the direction perpendicular to the machine direction (TD), and a specimen with a size of 20 mm (width)×(100 to 160) mm (length) is cut out, and then a special double-sided tape with a size of 20 mm (width)×(90 to 150) mm (length) is attached to a steel sheet. After attaching the cut-out plate specimen to the double-sided tape, rolling is performed three times in the same direction with the 2 Kg press roller. A tensile machine is used to test the adhesion of the plate, where the plate not comprising polyether siloxane has an adhesion of S1, and the plate comprising polyether siloxane has an adhesion of S2.

3. Resistance Drop Rate of Positive Electrode Plate

The resistance drop rate of a positive electrode plate is expressed as Ω, and Ω=(Ω1−Ω2)/Ω1×100%, where Ω2 is the resistance of the positive electrode plate of the present application, and Ω1 is the resistance of the positive electrode plate without the polyether siloxane, wherein the positive electrode plate used in the measurement of Ω1 has the same features as the positive electrode plate used in the measurement of Ω2 except that it does not comprise the polyether siloxane.

The determination method for Ω2 and Ω1 is as follows:

this test uses a film plate resistance meter of model BER1100 purchased from Yuanneng Technology (Xiamen) Co., Ltd.

a plate with an area of 4 cm×25 cm (longitudinal) is taken out along the mechanical stretching direction (MD), a current collector of the tested plate is placed in the middle of a probe, a run button on software is clicked and then a reversing valve is turned downward, and after 15 seconds, data is collected automatically; and the process is repeated as above for another point until 20 points are tested; and the respectively obtained resistances of 20 points are averaged to obtain the 122 and 121 values respectively.

4. Testing of Maximum Coating Weight Per Unit Area

A blank aluminum foil and a positive electrode plate that has been dried in the coating process (the positive electrode current collector of this positive electrode plate is coated on both surfaces) are prepared, and 15 small discs with an area of 1540.25 $mm^2$ are punched out respectively. The average mass of small discs of the blank aluminum foil is subtracted from the average mass of small discs of the plate, divided by 2, to obtain the coating weight per unit area. The "single surface" refers to coating on only one surface of the current collector, and is not the same concept as the number of layers of the "sublayer" described in the present application. The maximum coating weight per unit area in the tables refers to the single-surface weight.

The data of coating weight of the examples in the tables of the present application all refer to data of the maximum coating weight per unit area of single surface, and the performance of the plate and the performance of the battery are both measured under the maximum coating weight.

The maximum coating weight per unit area refers to the maximum coating weight when the plate does not crack or break in the breaking length test for the positive electrode plate during and after the coating of the plate.

5. Ratio of Silicon Contents Between Two Sublayers of Positive Electrode Film Layer The silicon contents in two sublayers of a positive electrode film layer are obtained by ion polishing of the cross-section and EDS test and compared.

Performance Tests for Battery

1. Determination of Energy Density

The batteries prepared in Examples and Comparative Examples are weighed to obtain the mass of the entire battery; and after formation capacity of the battery, it is allowed to stand at 25° C. for 10 min, charged at 0.33C to 100% SOC, depolarized with a small current, allowed to stand for 10 min, and discharged at 0.33 to 0% SOC, and the obtained capacity is the capacity of the battery at 0.33C. After standing for 30 min, the battery is charged to 100% SOC, allowed to stand for 30 min, and discharged with a constant current of 0.01C for 30 min, where the voltage has a stable process, and this stable value is the charge-discharge platform, thereby obtaining the platform voltage; and finally, the weight energy density of the battery is calculated, namely, mass energy density of battery=battery capacity× discharge platform voltage/weight of the entire battery, with a basic unit of Wh/kg (watt-hour/kg).

2. Determination of Direct Current Resistance (DCR)

The battery is tested for capacity at 25° C., and the capacity test method is as above. It is then charged at a constant voltage of 0.05C, allowed to stand for 60 min, discharged at 0.33C to 50% SOC, allowed to stand for 60 min, discharged at 0.33C to 20% SOC, allowed to stand for 60 min, and discharged at 0.33C to 0% SOC. Then, the open circuit voltage of 0% SOC is measured and the DCR data for 30 s is summarized.

See Tables 4 to 7 for the measurement results, where "/" in the tables represents that this item is absent, not added or undetectable.

In Tables 4 to 7, "(I)/(II)/(III)/(IV)" represents molar amount of structural unit (I)/molar amount of structural unit (11)/molar amount of structural unit (3)/molar amount of structural unit (IV), where the molar amount of structural unit (I) corresponds to the molar amount of precursor 1 in each Example; and the molar amount of the structural unit (II) corresponds to the molar amount of the precursor 2 in each Example; and the molar amount of the structural unit (3) corresponds to the molar amount of the precursor 3 in each Example; and the molar amount of the structural unit (IV) corresponds to the molar amount of the silane coupling agent in each Example.

TABLE 4

Performance comparison of positive electrode plates with and without addition of polyether siloxane and performance comparison of the corresponding batteries

| | Example no. | Example 1 | Example 2 | Comparative Example 1 |
|---|---|---|---|---|
| Polyether siloxane | A/B/D/E | Hydrogen/Methyl/ Ethyl/Phenyl | Fluoromethyl/Ethoxymethyl/ Ethyl/4-fluorophenyl | / |
| | (I)/(II)/(III)/(IV) | 100/200/40/19 | 100/200/40/19 | / |
| | Number average molecular weight | 1 w-3 w | 1 w-3 w | / |
| Positive electrode slurry | Weight ratio of polyether siloxane to positive electrode active material | 0.005 | 0.005 | / |
| | Mass ratio of lithium element to silicon element | 387 | 393 | / |
| | Stability factor V | 2 | 3 | 6 |
| Positive electrode | Number of layers of the positive electrode film layer | Single layer | Single layer | Single layer |

TABLE 4-continued

Performance comparison of positive electrode plates with and without addition of polyether siloxane and performance comparison of the corresponding batteries

| | Example no. | Example 1 | Example 2 | Comparative Example 1 |
|---|---|---|---|---|
| plate | Plate breaking length/mm | 0 | 0 | 50 |
| | Maximum coating weight per unit area/mg/cm$^2$ | 30 | 30 | 22 |
| | Adhesion increase rate S | 17% | 15% | 0 |
| | Resistance drop rate/Ω | 13% | 11% | 0 |
| Battery | Energy density/Wh/kg | 196 | 196 | 184 |
| | DCR/mΩ | 2.0 | 2.4 | 3.0 |

Data analysis: It can be seen from Table 5 that, compared with Comparative Example 1, after polyether siloxane is added into the corresponding positive electrode slurry in the Examples, the maximum coating weight per unit area is increased by 36.4%, the energy density is increased by 6.5%, and the DCR is decreased significantly, such that the battery performance is significantly improved.

TABLE 5

Influence of molecular weight of polyether siloxane on performance of positive electrode plate and battery

| Example no. | | Example 1 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Polyether siloxane | A/B/D/E | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl |
| | (I)/(II)/(III)/(IV) | 100/200/40/19 | 45/45/45/6 | 300/500/100/38 | 180/300/180/35 | 20/50/5/3 | 400/800/100/54 | 240/100/40/20 | 100/100/100/21 | 50/50/170/24 | 0/200/100/22 | 300/0/100/23 |
| | Number average molecular weight | 2 w-3 w | 1 w-2 w | 4 w-5 w | 5 w-6 w | 0.2 w-1 w | 7 w-9 w | 2 w-3 w | 2 w-3 w | 2 w-3 w | 2 w-3 w | 2 w-3 w |
| Positive electrode slurry | Weight ratio of polyether siloxane to positive electrode active material | 0.005 | 0.005 | 0.005 | 0.005 | 0.005 | 0.005 | 0.005 | 0.005 | 0.005 | 0.005 | 0.005 |
| | Mass ratio of lithium element to silicon element | 387 | 391 | 404 | 410 | 387 | 384 | 392 | 391 | 391 | 380 | 387 |
| | Stability factor V | 2 | 4 | 3 | 2 | 6 | 8 | 2 | 3 | 4 | 2 | 2 |
| Positive electrode plate | Number of layers of the positive electrode film layer | Single layer | Single layer | Single layer | Single layer | Single layer | Single layer | Single layer | Single layer | Single layer | Single layer | Single layer |
| | Plate breaking length/mm | 0 | 1 | 0 | 0.5 | 50 | 0 | 0.8 | 0 | 0 | 0.6 | 0 |
| | Maximum coating weight per unit area/mg/cm$^2$ | 30 | 29 | 31 | 31 | 23 | 31 | 29 | 28.5 | 29 | 30 | 30 |
| | Adhesion increase rate S | 17% | 14% | 18% | 18% | 0% | 20% | 16% | 15% | 16% | 15% | 17% |

TABLE 5-continued

Influence of molecular weight of polyether siloxane on performance of positive electrode plate and battery

| Example no. | | Example 1 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| | Resistance drop rate/Ω | 13% | 11% | 12% | 11% | 0% | 50% | 12% | 12% | 13% | 15% | 9% |
| Battery | Energy density/Wh/kg | 196 | 195 | 197 | 197 | 184.5 | 197 | 195 | 194 | 195 | 196 | 196 |
| | DCR/mΩ | 2.0 | 2.0 | 2.4 | 2.4 | 3.0 | 8 | 2.0 | 2.2 | 2.1 | 1.8 | 2.0 |

Data analysis: As can be seen from Table 5, the molecular weight of the polyether siloxane affects the coating weight per unit area and the energy density of the battery. When the molecular weight of polyether siloxane is <1 w (for example, in Example 6), the stability of the positive electrode slurry is poor, thus the phenomenon of physical gelatinization is likely to occur, the positive electrode plate is prone to cracking, the plate breaking length of the positive electrode plate is long, and the energy density of the corresponding battery is low; and when the molecular weight of polyether siloxane is >7 w (for example, in Example 7), because the cross-linking between polyether siloxanes is likely to occur, the stability of the corresponding positive electrode slurry is poor, resulting in high resistance of the positive electrode plate and large DCR of the corresponding battery.

Data analysis: It can be seen from Table 6 that when the weight ratio of polyether siloxane to positive electrode active material is <0.0005 (for example, in Example 18), the maximum coating weight of the positive electrode plate is 22 mg/cm$^2$, the energy density of the corresponding battery is low, and when the coating weight exceeds this value, the positive electrode plate cracks seriously; and when the weight ratio of polyether siloxane to positive electrode active material is >0.03 (for example, in Example 19), the film plate resistance of the positive electrode plate is deteriorated and the battery resistance DCR is high.

TABLE 6

Investigation on weight ratio of polyether siloxane to positive electrode active material in positive electrode slurry

| No. | | Example 1 | Example 13 | Example 14 | Example 15 | Example 16 | Example 17 | Example 18 | Example 19 |
|---|---|---|---|---|---|---|---|---|---|
| Polyether siloxane | A/B/D/E | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl | Hydrogen/Methyl/Ethyl/Phenyl |
| | (I)/(II)/(III)/(IV) | 100/200/40/19 | 100/200/40/19 | 100/200/40/19 | 100/200/40/19 | 100/200/40/19 | 100/200/40/19 | 100/200/40/19 | 100/200/40/19 |
| | Number average molecular weight | 2 w-3 w | 2 w-3 w | 2 w-3 w | 2 w-3 w | 2 w-3 w | 2 w-3 w | 2 w-3 w | 2 w-3 w |
| Positive electrode slurry | Weight ratio of polyether siloxane to positive electrode active material | 0.005 | 0.0005 | 0.03 | 0.001 | 0.02 | 0.006 | 0.0003 | 0.04 |
| | Mass ratio of lithium element to silicon element | 387 | 3872 | 63 | 1941 | 95 | 322 | 6442 | 47 |
| | Stability factor V | 2 | 3 | 6 | 3 | 6 | 3 | 4 | 8 |
| Positive electrode plate | Number of layers of the positive electrode film layer | Single layer | Single layer | Single layer | Single layer | Single layer | Single layer | Single layer | Single layer |
| | Plate breaking length/mm | 0 | 2 | 0 | 0 | 0 | 0 | 50 | 0 |
| | Maximum coating weight per unit area/mg/cm$^2$ | 30 | 25 | 31 | 30 | 31 | 30 | 22 | 31 |
| | Adhesion increase rate S | 17% | 5% | 19% | 17% | 19% | 20% | 0% | 20% |
| | Resistance drop rate/Ω | 13% | 6% | 5% | 14% | 8% | 15% | 0% | −50% |
| Battery | Energy density/Wh/kg | 196.0 | 187.0 | 197.0 | 196.0 | 196.5 | 196.0 | 184.0 | 197 |
| | DCR/mΩ | 2.0 | 2.0 | 7 | 2.4 | 3.8 | 2.0 | 2.0 | 8.0 |

TABLE 7

Comparison of single-layer positive electrode film layer and double-layer positive electrode film layer

| No. | | Example 1 | Example 20 | Example 21 | Example 22 | Example 23 | Example 24 | Example 25 | Example 26 |
|---|---|---|---|---|---|---|---|---|---|
| Polyether siloxane | A/B/D/E | Hydrogen/ Methyl/ Ethyl/Phenyl | Hydrogen/ Methyl/ Ethyl/Phenyl | Hydrogen/ Methyl/ Ethyl/Phenyl | Hydrogen/ Methyl/ Ethyl/Phenyl | Hydrogen/ Methyl/ Ethyl/Phenyl | Hydrogen/ Methyl/ Ethyl/Phenyl | Hydrogen/ Methyl/ Ethyl/Phenyl | Hydrogen/ Methyl/ Ethyl/Phenyl |
| | (I)/(II)/(III)/(IV) | 100/200/40/ 19 | 100/200/40/ 19 | 100/200/40/ 19 | 100/200/40/ 19 | 100/200/40/ 19 | 100/200/40/ 19 | 100/200/40/ 19 | 100/200/40/ 19 |
| | Number average molecular weight | 2 w-3 w | 2 w-3 w | 2 w-3 w | 2 w-3 w | 2 w-3 w | 2 w-3 w | 2 w-3 w | 2 w-3 w |
| Positive electrode slurry | Weight ratio of polyether siloxane to positive electrode active material (sublayer closer to current collector) | 0.005 | 0.0000 | 0.0005 | 0.0026 | 0.0047 | 0.0302 | 0.0316 | 0.0374 |
| | Weight ratio of polyether siloxane to positive electrode active material (sublayer farther from current collector) | | 0.0052 | 0.0047 | 0.0026 | 0.0005 | 0.0010 | 0.0005 | 0.0005 |
| | Mass ratio of lithium element to silicon element (sublayer closer to current collector) | 387 | 0 | 3872 | 776 | 431 | 67 | 64 | 54 |
| | Mass ratio of lithium element to silicon element (sublayer farther from current collector) | | 387 | 431 | 773 | 3864 | 2043 | 3870 | 3872 |
| | Stability factor V (sublayer closer to current collector) | 2 | 6.0 | 2.0 | 2.2 | 2 | 6 | 6 | 8 |
| | Stability factor V (sublayer farther from current collector) | | 2.0 | 2.2 | 2.2 | 3 | 2 | 3 | 3 |
| Positive electrode plate | Number of layers of the positive electrode film layer | Single layer | Two sublayers | Two sublayers | Two sublayers | Two sublayers | Two sublayers | Two sublayers | Two sublayers |
| | Ratio of silicon contents between the two layers | / | 0 | 0.1 | 1.0 | 9 | 30.6 | 59.0 | 69.8 |
| | Plate breaking length/mm | 0 | 0 | 0 | 0 | 0 | 0 | 0 | 0 |
| | Maximum coating weight per unit area/mg/cm$^2$ | 30 | 40 | 42 | 42 | 40 | 41 | 42 | 41 |
| | Adhesion increase rate S | 17% | 18% | 18% | 16% | 16% | 19% | 19% | 20% |
| | Resistance drop rate/Ω | 13% | 11% | 10% | 10% | 12% | 6% | 2% | −50% |
| Battery | Energy density/Wh/kg | 196 | 213 | 216 | 216 | 213 | 215 | 216 | 215 |
| | DCR/mΩ | 2.0 | 2.4 | 2.6 | 2.6 | 2.5 | 4.0 | 9.0 | 10.0 |

Data analysis: It can be seen from Table 7 that the maximum coating weight per unit area of the corresponding positive electrode plate in Example 1 is 30 mg/cm$^2$, which is lower than that of Example 20 to Example 26, and the corresponding energy density is also lower than that of Example 20 to Example 26. Further, By comparing Examples 20 to 26, it can be seen that when the ratio of the weight content of silicon in the sublayer closest to the positive electrode current collector to the weight content of silicon in the sublayer farthest from the positive electrode current collector is >60 (Example 26), the excessive distribution of polyether siloxane in the sublayer closest to the positive electrode current collector will affect the stability of the slurry and the film plate resistance of the plate, resulting in an increase in the DCR of the corresponding battery.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also HI within the scope of the present application.

The invention claimed is:

1. A positive electrode slurry comprising a positive electrode active material and a polyether siloxane, wherein the polyether siloxane comprises at least the following structural units: at least one of (I) and (II), and both (III) and (IV), (I)

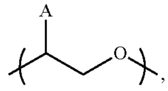, (II)

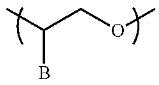

(III)

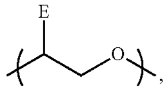, (IV)

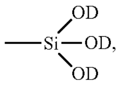, wherein

D is methyl or ethyl;

A is hydrogen, halogen or haloalkyl;

B is hydroxyl, R, OR, or ROR', wherein the R and R' are each independently a linear or branched alkyl group containing 1 to 8 carbons; and E is phenyl, alkyl-substituted phenyl, ether-substituted phenyl or halophenyl.

2. The positive electrode slurry according to claim 1, wherein the polyether siloxane has a number average molecular weight ranging from 10,000 to 60,000.

3. The positive electrode slurry according to claim 1, wherein based on the total molar amount of structural unit (I) to structural unit (IV), the molar proportion of structural unit (I) is 0 to 75 mol %, the molar proportion of structural unit (II) is 0 to 70 mol %, the molar proportion of structural unit (III) is 5 to 65 mol %, and the molar proportion of structural unit (IV) is 4 to 10 mol %, wherein the molar proportions of structural unit (I) and structural unit (II) are not both zero.

4. The positive electrode slurry according to claim 1, wherein the weight ratio of the polyether siloxane to the positive electrode active material ranges from 0.0005 to 0.030.

5. The positive electrode slurry according to claim 1, wherein the positive electrode active material is selected from at least one of lithium iron phosphate, lithium iron manganese phosphate, lithium manganese oxide, lithium cobalt oxide, lithium nickel cobalt manganese oxide, lithium nickel cobalt aluminum oxide, lithium nickel oxide or a mixture thereof.

6. The positive electrode slurry according to claim 1, wherein the positive electrode slurry has a stability factor of $0<V\leq 6$, where $V=(V2-V1)/V1\times 100\%$, in which V1 is the initial viscosity of the positive electrode slurry, and V2 is the viscosity of the positive electrode slurry 48 hours after preparation, wherein the positive electrode slurry used in the measurement of V1 and the positive electrode slurry used in the measurement of V2 are the same batch of positive electrode slurry.

7. A positive electrode plate comprising a positive electrode current collector; and a positive electrode film layer on at least one surface of the positive electrode current collector, wherein the positive electrode film layer is prepared from the positive electrode slurry according to claim 1, and the mass of the positive electrode film layer per unit area plate ranges from 13 to 45 $mg/cm^2$, wherein the mass is the mass of the positive electrode film layer on a single surface of the plate.

8. The positive electrode plate according to claim 7, wherein the weight ratio of lithium element to silicon element in the positive electrode plate ranges from 60 to 3875.

9. The positive electrode plate according to claim 8, wherein the positive electrode film layer comprises two sublayers which are parallel to the positive electrode current collector and overlap each other, wherein the ratio of the weight content of silicon in the sublayer closest to the positive electrode current collector to the weight content of silicon in the sublayer farthest from the positive electrode current collector ranges from 0 to 60.

10. The positive electrode plate according to claim 7, wherein when the flexibility of the plate is determined by half-folding and rolling, the positive electrode plate has a plate breaking length of 0, or the positive electrode plate has a plate breaking length of greater than 0 and less than or equal to 2 mm.

11. The positive electrode plate according to claim 7, wherein the positive electrode plate has an adhesion increase rate S ranging from 2 to 50%, where $S=(S2-S1)/S1\times 100\%$, in which S2 is the adhesion between the positive electrode film layer and the positive electrode current collector of the positive electrode plate, and S1 is the adhesion between the positive electrode film layer and the positive electrode current collector of the positive electrode plate without the polyether siloxane, wherein the positive electrode plate used in the measurement of S1 is the same as the positive electrode plate used in the measurement of S2, except that the positive electrode plate used in the measurement of S1 does not comprise the polyether siloxane, while the positive electrode plate used in the measurement of S2 comprises the polyether siloxane.

12. The positive electrode plate according to claim 7, wherein the positive electrode film plate in the positive electrode plate has a resistance drop rate £2 ranging from 0 to 18%, wherein $\Omega=(\Omega 1-\Omega 2)/\Omega 1\times 100\%$, in which Ω2 is the resistance of the positive electrode film plate, and Ω1 is the resistance of the positive electrode film plate without the polyether siloxane, wherein the positive electrode film plate used in the measurement of Ω1 is the same as the positive electrode film plate used in the measurement of Ω2, except that the positive electrode film plate used in the measurement of Ω1 does not comprise the polyether siloxane, while the positive electrode film plate used in the measurement of Ω2 comprises the polyether siloxane.

13. A secondary battery comprising the positive electrode plate according to claim 7.

14. The positive electrode slurry according to claim 1, wherein the halogen is fluorine, chlorine or bromine.

* * * * *